United States Patent [19]
Purdy et al.

[11] 3,900,152
[45] Aug. 19, 1975

[54] METHOD OF METALS JOINING
[75] Inventors: David L. Purdy; John F. Williams, both of Indiana, Pa.
[73] Assignee: Arco Nuclear Company, Leechburgh, Pa.
[22] Filed: June 27, 1973
[21] Appl. No.: 374,013

Related U.S. Application Data
[62] Division of Ser. No. 127,807, March 24, 1971, abandoned, which is a division of Ser. No. 624,916, March 21, 1967, Pat. No. 3,599,317.

[52] U.S. Cl. ................. 228/221; 228/249; 228/263
[51] Int. Cl. ......................... B23k 31/02; B23k 35/38
[58] Field of Search .......... 29/504, 473.1, 501, 198, 29/199, 494

[56] References Cited
UNITED STATES PATENTS

| | | | |
|---|---|---|---|
| 2,822,269 | 2/1958 | Long | 29/504 X |
| 2,847,302 | 8/1958 | Long | 29/504 X |
| 2,857,663 | 10/1958 | Beggs | 29/473.1 |
| 2,902,755 | 9/1959 | Salt et al. | 29/504 X |
| 3,091,028 | 5/1963 | Westbrook et al. | 29/473.1 |
| 3,675,311 | 7/1972 | Wells | 29/504 X |
| 3,708,866 | 1/1973 | Wells | 29/504 X |

Primary Examiner—J. Spencer Overholser
Assistant Examiner—Ronald J. Shore
Attorney, Agent, or Firm—John R. Ewbank; Hymen Diamond

[57] ABSTRACT

The method of joining members 33 and 31 (FIG. 2) of copper and corrosion and/or temperature-resistant nickel-base alloys in the practice of which a mass 35 (FIG. 2) of titanium is interposed between the members and the joint is heated to produce a eutectic of copper and titanium and then permitted to solidify.

1 Claim, 3 Drawing Figures

PATENTED AUG 19 1975  3,900,152

METHOD OF METALS JOINING

REFERENCE TO RELATED DOCUMENTS

This application is a division of now abandoned application Ser. No. 127,807 filed Mar. 24, 1971 to David L. Purdy et al. for METHOD OF METALS JOINING AND ARTICLE PRODUCED BY SUCH METHOD and assigned to Nuclear Materials And Equipment corporation, the said application Ser. No. 127,807 being a division of Ser. No. 624,916, filed March 21, 1967, now U.S. Pat. No. 3,599,317 granted Aug. 17, 1971 for METHOD OF METALS JOINING.

BACKGROUND OF THE INVENTION

This invention relates to metals joining and has particular relationship to the joining by metallurgical seals of materials encountered in the producing of electrical generators for regions where commercial power is not available; typically remote regions of the earth and outer space. In such generators the primary source of power is highly radioactive material and the heat is converted into electrical energy by thermoelectric modules. It is necessary that the heat be transferred from the radioactive capsule to the hot junction of the thermoelectric elements to the modules through a highly thermally conducting member which is electrically insulating. The metallic parts, for example the pressure tight container, of the thermoelectric module is, in some generators, composed of HASTELLOY C, X or B alloys to achieve corrosion resistance, and a maximum of strength while minimizing bypass heat flow to the cold junctions of the modules.

HASTELLOY C, X and B are sold by Union Carbide Corporation and are described in Union Carbide Corporation leaflets F30,037D of October 1964 and F30,107C of June 1963 and also in the table on page 173 of the 1965 issue of Materials Design Engineering — Materials Section. These alloys have substantially the following compositions in percent:

|       | HASTELLOY C | HASTELLOY X | HASTELLOY B |
|-------|-------------|-------------|-------------|
| Ni    | 54          | 47          | 61          |
| Mo    | 16          | 9           | 28          |
| Cr    | 15.5        | 22          | 1           |
| Fe    | 5           | 18          | 5           |
| W     | 4           | 0.6         |             |
| Co    | 2.5         | 1.5         | 2.5         |
| C     | 0.08        | 0.1         | 0.05        |
| Other | 2.92        | 1.8         | 2.45        |

The highly thermally conducting member is interposed between the container and the hot junctions and the heat is transferred from the container through a copper plate on the member. In producing generators with a radioactive source it is necessary to produce a seal between the HASTELLOY nickel alloys and copper and it is an object of this invention to provide a method for producing each a seal.

SUMMARY OF THE INVENTION

This invention arises from the discovery that the eutectic of titanium and copper wets, and adheres to the above tabulated HASTELLOY C, X and B nickel to, In accordance with this aspect of this invention a thin titanium mass is interposed between members of the nickel alloys and copper to form a joint and the joint is heated in a vacuum to a temperature at which it liquefies and thereafter is permitted to solidify to form a seal. This seal is included in the highly thermally conducting electrically insulating member.

BRIEF DESCRIPTION OF THE DRAWINGS

For a better understanding of this invention, both as to its organization and as to its method of operation, together with additional objects and advantages thereof, reference is made to the following description taken in connection with the accompanying drawings, in which.

DESCRIPTION OF PREFERRED EMBODIMENT

Figure 1:
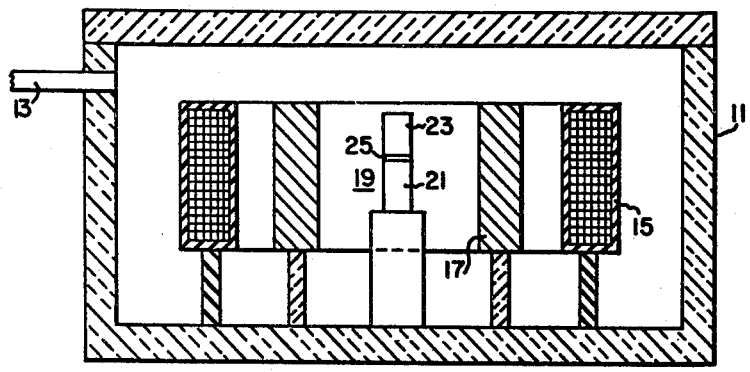
FIG. 1 is a diagrammatic view presented as a view in longitudinal section showing apparatus for practicing this invention.

The apparatus shown in FIG. 1 includes a closed container 11 having one or plurality of connections 13 for evacuation by a pumping system (not shown). Within the container there is a heating coil 15 which may be supplied from a source of high-frequency power (not shown). Within the coil there is a susceptor 17 of tantalum or other suitable material. The work 19 to be joined is mounted within the susceptor.

Typically the work 19 is disclosed in the patent application Ser. No. 127,807 as including a cylinder 21 of KENNERTIUM tungsten alloy and a cylinder 23 of copper. A thin mass 25 of titanium is interposed between the cylinders 21 and 23. The purpose of the susceptor 17 is to provide even heating of the work piece 19 and to eliminate high temperature spots on the work by reason of directly induced currents from the field of coil 15 into the work. The work 19 in the practice of this invention includes the parts which form the seal shown in FIG. 2.

In the practice of this invention the chamber 11 is evacuated to low pressure, for example of the order of $10^{-6}$ Torr. The coil 15 is then energized heating the susceptor 17 to a high temperature. The radiation from the susceptor 17 heats the joint including the titanium mass 35 to a temperature at which it produces a copper-titanium eutectic and becomes liquid. The joint is then permitted to solidify. The resulting structure is a brazed assembly of copper and a HASTELLOY alloy.

Figure 2:
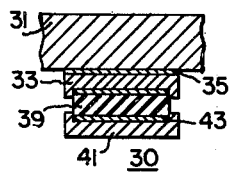
FIG. 2 is a fragmental view in section showing an electrically insulating assembly for effectively transferring heat from a member of the above-described nickel alloys.
Figure 3:
FIG. 3 is a photomicrograph of a nickel-alloy-copper joint.

FIG. 2 shows a highly thermally conducting electrically insulating member 30 sealed to a container 31 of one of the HASTELLOY nickel alloys. The member 30 includes a copper plate 33 which is sealed to the container 31. To provide the seal 35 a thin mass of titanium is interposed between the container 31 and the plate 33 and the resulting joint is heated (to about 950°C) in a vacuum or other non-reactive atmosphere to liquefy the metal and form the joint 35. Thereafter the liquid metal is cooled slowly and solidified. FIG. 3 shows a photomicrograph, at 100 magnification, of a seal produced in this manner between HASTELLOY-C nickel-alloy and copper.

While preferred embodiments of this invention have been disclosed herein, many modifications thereof are feasible. This invention, then, is not to be restricted except insofar as is necessitated by the spirit of the prior art.

We claim;

1. The method of producing an assembly composed of a member of one of the class of nickel alloys consisting of the alloys C, X and B, having respectively substantially the following compositions, C = Ni 54%, Mo 16%, Cr 15.5%, Fe 5%, W 4%, Co 2.5%, C 0.08, other 2.92%, X = Ni 47%, Cr 22%, Fe 18%, Mo 9%, Co 1.5%, W 0.6%, C 0.1%, other 1.8%, B = Ni 61%, Mo 28%, Fe 5%, Co 2.5%, Cr 1%, C 0.05%, other 2.45%, and a member of copper, the said method comprising, interposing a thin mass of titanium between said members to form a joint between said members, placing said members with said joint between them in an evacuated atmosphere, heating said joint to a temperature at which said joint becomes liquid, and then cooling said joint to permit it to solidify.

* * * * *